United States Patent [19]

Denne et al.

[11] Patent Number: 4,691,202
[45] Date of Patent: Sep. 1, 1987

[54] IDENTIFICATION SYSTEMS

[76] Inventors: Phillip R. M. Denne, 70 Systems Limited, Unit 7, The Alpha Centre, Upton Road, Poole, Dorset; Christopher D. Hook, 21 Chantry Close, Windsor, Berkshire, both of England

[21] Appl. No.: 719,551

[22] Filed: Apr. 3, 1985

[30] Foreign Application Priority Data

Apr. 3, 1984 [GB] United Kingdom ................. 8408538

[51] Int. Cl.$^4$ ...................... H04Q 7/00; G07D 7/00; G06K 5/00
[52] U.S. Cl. .................... 340/825.54; 340/825.5; 340/825.34; 235/382
[58] Field of Search ...................... 340/825.54, 825.34, 340/825.31, 825.5; 235/382, 382.5, 380; 343/6.5 R, 6.8 R; 375/120

[56] References Cited

U.S. PATENT DOCUMENTS

| | | | |
|---|---|---|---|
| 3,772,668 | 11/1973 | Smith | 340/825.54 |
| 3,944,928 | 3/1976 | Augenblick et al. | 340/825.54 |
| 4,063,173 | 12/1977 | Nelson et al. | 343/6.8 R |
| 4,399,437 | 8/1983 | Falck et al. | 340/825.54 |
| 4,459,474 | 7/1984 | Walton | 340/825.31 |
| 4,471,356 | 9/1984 | Gidl | 340/825.54 |
| 4,546,322 | 10/1985 | Crutcher | 375/120 |

FOREIGN PATENT DOCUMENTS

| | | | |
|---|---|---|---|
| 2354067 | 5/1975 | Fed. Rep. of Germany | 340/825.54 |
| 2112607 | 7/1983 | United Kingdom . | |

Primary Examiner—Ulysses Weldon
Assistant Examiner—Ralph E. Smith
Attorney, Agent, or Firm—Watson Cole

[57] ABSTRACT

An identification system comprises an interrogator which transmits an interrogation signal to a plurality of transponders, each of which is arranged automatically to reply by means of a first coded identification signal stored in the transponder and modulated onto a carrier wave transmitted by the transponder. The interrogator receives and checks the reply signal. In the event of there being a plurality of transponders within range and broadcasting reply signals simultaneously, the interrogator receives corrupted reply signals. The interrogator therefore retransmits the reply signals to the transponders and each transponder checks the retransmitted reply signal with its first coded identification signal. In the event of correspondence the transponder discontinues transmission and in the event of non-correspondence the transponder continues transmission. In a polling mode of operation, the interrogator initially transmits a second coded identification signal corresponding to a selected transponder, and each transponder within the range compares the second signal with the first signal stored therein. If correspondence is established, the transponder is adjusted to receive further instructions which may comprise replacement of data stored therein. Each transponder includes a demodulator 34 comprising a phase locked loop which provides data, clock and carrier detect signals to a CPU 50 which includes ROM, RAM and an ALU. The carrier detect signal enables the CPU to switch the transponder from a power down condition to a power up condition.

10 Claims, 12 Drawing Figures

IDENTIFICATION SYSTEMS

BACKGROUND OF THE INVENTION

1. Field of the Invention

The present invention relates to an identification system, wherein a first unit commonly referred to as a transmitter, interrogator or decoder is operative to identify one or a plurality of second units commonly referred to as responders or transponders.

For the purpose of this specification the first unit will be referred to as an interrogator, such interrogator being operative to generate a signal over a range (for example 1 meter) and to detect a signal generated by a second unit located within the range.

For the purposes of this specification, the second units will be referred to as transponders, each transponder being operative to detect the signal generated by the interrogator, and to emit in response to such detection a signal for reception by the interrogator.

2. Prior Art

Such identification systems are well known and are in general use for access control systems, for animal identification, for vehicle identification and for the identification of valuable goods or partially assembled items on a production line. For example in an access control system, an interrogator is installed near a security door and interrogates transponders in the form of tags carried by personel wishing to gain access to the door.

Application No. UK-A-2112607 discloses an identification system wherein each of a plurality of transponders (referred to in that specification as responders) has a code which uniquely characterizes that transponder, and this code is transmitted by the transponder as a modulation signal of a carrier signal ($S_2$), in response to reception by the transponder of an interrogation signal ($S_1$), so that the interrogator can recognise the presence of the transponder. However the system disclosed in UK-A-2112607 cannot deal with the common requirement by users of such systems that more than one transponder shall be recognised simultaneously. This occurs in access control systems when two or more people crowd closely together near a door which is controlled by transponder signals, or when a number of cattle crowd together close to an automatic feeding station or when several goods are loaded together on to a pallet ready for trans-shipment.

SUMMARY OF THE INVENTION

We therefore propose in a first aspect of the invention to provide an identification system comprising an interrogator and a plurality of transponders wherein each transponder is arranged to transmit a reply signal in response to detection or an interrogating signal, the reply signal comprising a coded identification signal, each coded signal being unique to the respective transponder, and the interrogator having means for detecting and verifying the coded signals and having means for resolving contention between coded signals from different transponders which arrive at the interrogator overlapping in time.

In a preferred method of interrogation, the interrogator transmits a continuous unmodulated signal which is detected by a transponder. In response to such detection, the circuits within the transponder are arranged automatically to retrieve from a memory store coded data uniquely characterising that transponder. This coded data is modulated on a signal which is transmitted from the transponder and is detected by the interrogator. The coded data is of predetermined length and data format and the interrogator checks the error correction information etc. in the data to ascertain whether a valid signal has been received from the transponder or whether the signal from the transponder has been subject to interference for example from another transponder simultaneously transmitting. In any event, the interrogator re-transmits the signal it has received and this is compared in the transponder with the data stored therein. If correspondence is achieved then the transponder switches off, thus signalling to the interrogator that it has been identified. If however because of signal interference there is no correspondence in the transponder, the transponder continues transmitting until a valid signal is received by the interrogator.

In another mode of operation of the identification system, the interrogator is arranged to poll transponders within its range by transmitting a signal modulated with the identification code of a particular transponder. All the transponders within range receive the data and compare the data received with the data contained in store. If correspondence is achieved the transponder transmits an acknowledgement signal, sets up an instruction register to receive a further instruction from the interrogator, and then switches to a power down condition. If no correspondence is achieved the transponder stays silent.

In some modes of operation, the transponder may contain several pages of data which need to be changed. In such a case once a transponder has been set up for further instructions by means of a polling operation, the fresh data is transmitted from the interrogator page by page to replace the original data. As each page is received by the transponder, the transponder re-transmits the data to the interrogator where it is checked with the original data sent for correctness.

It will be seen in all these modes of operation of the identification system, the concept of checking data received by the interrogator or transponder by re-transmitting the information back to the original transmitter where it is checked for correctness is an important operation which ensures correct running of the modes of operation.

In a further aspect of the invention therefore there is provided an identification system comprising an interrogator and a plurality of transponders wherein the transponder is arranged to transmit a carrier signal modulated with data unique to that transponder, and the interrogator includes demodulation means for demodulating the transponder signal, and transmitter means for re-transmitting the signal received from the transponder, and the transponder including receiver means for receiving the re-transmitted signal and comparison means for comparing the data re-transmitted by the interrogator with the data which is transmitted by the transponder.

As preferred this operation occurs in real time so that while the transponder is still transmitting data, the interrogator "echoes" the data back to the transponder where the transponder can check the data with the data which is being transmitted. This is the basis of the contention operation and ensures a speedy resolution of contention to ensure identification of all transponders.

In another aspect of the invention there is provided an identification system comprising an interrogator and a plurality of transponders, wherein the interrogator is arranged to transmit a carrier signal modulated with data unique to one transponder, and each transponder includes demodulation means for demodulating the interrogation signal, comparison means for comparing the demodulated data with data stored in the transponder, and means within the transponder for carrying out a predetermined course of action dependent on the comparison.

Thus in this aspect of the invention, the interrogator may poll the transponders, and where a transponder recognises the information transmitted by the interrogator it may set up an instruction register to receive further instructions from the interrogator. Such further instructions may comprise the replacement of the data within the memory store of the transponder, and where the data comprises a plurality of pages, the pages may be sent sequentially by the interrogator, each page when it is received by the transponder being re-transmitted to the interrogator for comparison by the interrogator with the data originally transmitted for correctness.

In a further aspect of the invention there is provided an identification system comprising an interrogator and at least one transponder wherein the interrogator transmits a continuous carrier signal being modulated in phase so as to carry data and each transponder including means for detecting the carrier signal and including a phase locked loop for demodulating the carrier signal to provide a data signal representing the information modulated on the carrier signal, a clock signal derived from the carrier signal and including integrator means responsive to the clock signal to provide a continuous carrier detect signal which is operative to switch on circuitry of the transponder.

The advantage of providing a continuous carrier signal which is modulated in phase so as to carry data is that the carrier signal is not at a zero value for any period of time. This is in contrast to for example an amplitude modulation system where the carrier signal may not be transmitted if there is no data to be transmitted. The advantage of this arrangement is that a continuous carrier detect signal which is operative to switch on circuitry of the transponder from a quiescent condition is always at a positive value and does not go to a zero condition upon absence of the carrier signal in which case the circuitry of the transponder may go to a power down condition and the correct operation of the transponder may be interfered with.

BRIEF DESCRIPTION OF THE DRAWINGS

A preferred embodiment of an identification system according to the invention will now be described with reference to the accompanying drawings wherein.

DETAILED DESCRIPTION OF A PREFERRED EMBODIMENT

Figure 1:
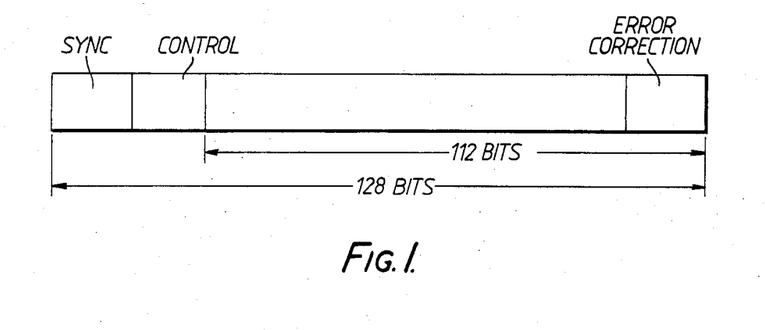
FIG. 1 is a diagram of data transmitted by the interrogator and the transponders.

Referring now to FIG. 1 there is shown the message structure of data transmitted from the interrogator to the transponder and of data transmitted from the transponder to the interrogator, the structure being the same in each case. The message area typically consists of 64 to 128 bits, divided into bytes which contain data and error correction bits. The control area typically contains one byte of information which is used by the transponder to accept instructions from the interrogator ("up link"). The instruction area is not used by the transponder in communicating with the interrogator ("down link") but is sent as a blank (i.e. all zeros+-parity). The synchronising word is used to define the start of the message in each case and is also used to set the demodulators in the transponder and the interrogator unit to produce data of the correct phase.

Figure 2:
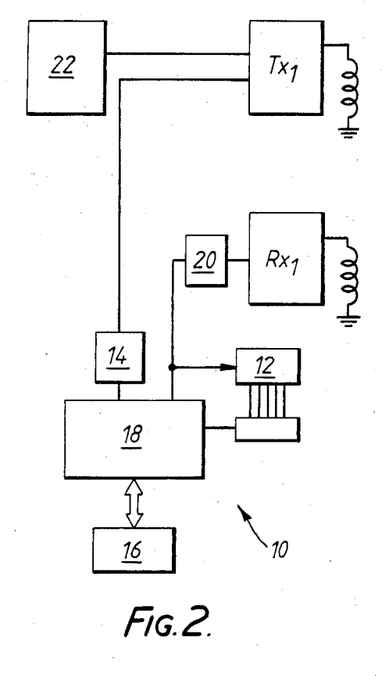
FIG. 2 is an overall block diagram of an interrogator for an identification system according to the invention.

Referring now to FIG. 2 the interrogator comprises a control unit 10 comprising comparator logic 12, output data register 14, a main memory 16, a CPU 18 and an input data register 20. The interrogator comprises a transmitter TX1 and a receiver RX1. The transmitter TX1 is provided with a signal from a source 22 at 132 Khz. This serves as an interrogation signal and in normal circumstances provides a continuous unmodulated signal detectable by a transponder at a range of about 1 meter around the interrogator.

In some circumstances data may be transmitted from transmitter TX1 and in such a case data is supplied from an output data register 14 of control unit 10 to transmitter TX1. Transmitter TX1 includes a phase modulator of conventional type for modulating the phase encoded signal onto the carrier signal. A receiver RXI is provided tuned to a frequency of 66 Khz and including a phase demodulator of conventional type for demodulating data carried on the carrier wave received by receiver RX1. Such data is fed from a data input buffer 20 into a comparator unit 12 for performing predetermined operations.

Figure 3:
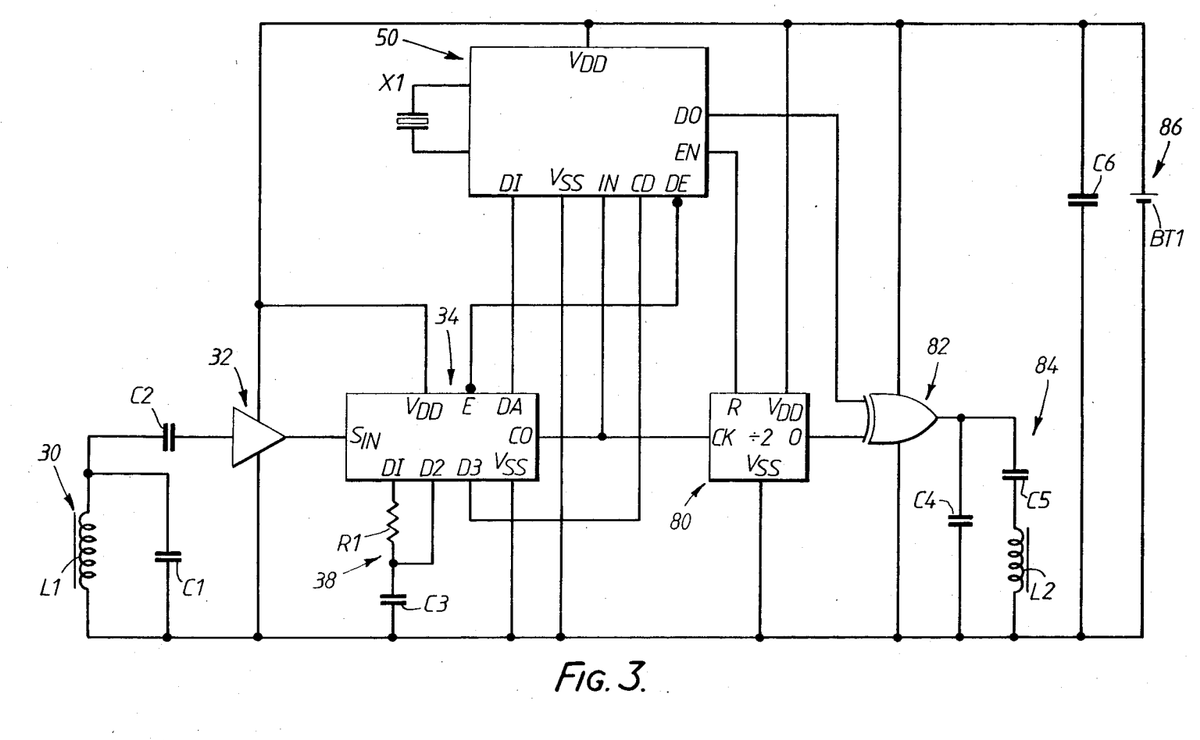
FIG. 3 is a block diagram of the transponder.

Referring now to FIG. 3 there is shown a preferred embodiment of the transponder circuit.

Figure 4:
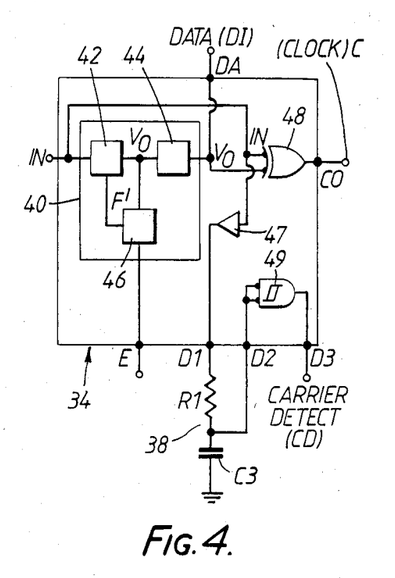
FIG. 4 is a more detailed block diagram of the demodulator of the transponder.

The transponder circuit comprises a receiver 30 comprising a ferrite-cored inductor L1 and tuning capacitor C1, designed to produce a parallel resonant circuit with a centre frequency of 132 Khz. This circuit receives the signal sent to the transponder by the interrogator, when the transponder inductively coupled to the interrogator. A capacitor C2 AC couples the receiver 30 to an amplifier 32, and amplifier 32 provides voltage gain which amplifies the signal to produce a logic level signal at the output of the amplifier, of about 250 millivolts which is sufficient, to actuate transistor circuits in the next stage of the transponder circuit. The next stage of the transistor circuit comprises a demodulator 34. This comprises a phase sensitive detector which is shown in more detail in FIG. 4 which operates to demodulate the phase encoded signals sent to the transponder by the interrogator. Referring to FIG. 4 the demodulator as shown comprises a phase locked loop 40 having a phase comparator 42, a filter 44 and a voltage controlled oscillator 46 connected in the conventional arrangement so that the output $V_0$ of the phase comparator 42 is supplied as an input to voltage control oscillator 46. The oscillator provides a signal F' at a frequency nominally equal to the input frequency of 132 Khz but ajusted so as to be at 90° in phase difference to input signal. This is in accordance with the well known theory of phase locked loops provides a demodulated signal $V_0$ which comprises the modulated signal present in the input signal. Signal $V_O$ is then applied via filter 44 to a demodulator circuit 48 which as shown comprises an exclusive OR gate. The input signal IN is applied to the other input of the exclusive OR gate. Thus the exclusive OR gate is operative to remove the modulating signal and provide at the output only the carrier signal. The carrier signal is shown as signal C and is used to provide a basic clock signal C.

The input signal IN is fed via an amplifier 47 to an output D1 and is integrated by an external integrator 38 comprising resistor $R_1$ and capacitor $C_3$. The output of the integrator is connected to the demodulator at pin D2 and a buffer stage 49 in the demodulator squares the signal at the D2 to produce a clean logic signal at pin D3. This is connected to CPU 50 via input pin CD, and may be regarded as a carrier detect signal.

Figure 5:
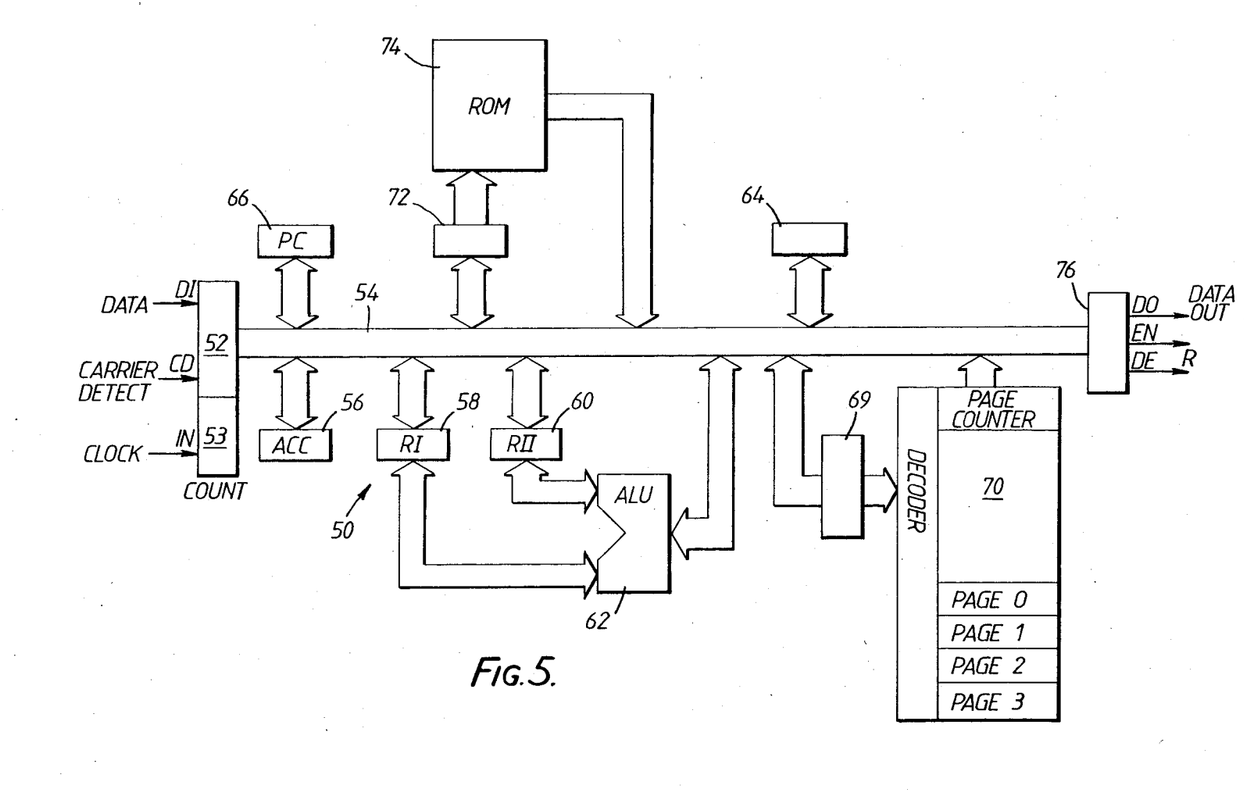
FIG. 5 is a more detailed diagram of the CPU of the transponder.

The central processing unit is shown in more detail in FIG. 5 as comprising a data register 52 connected to a signal data/address bus 54 to which the remaining units shown of the CPU unit are connected. These units comprise a count register COUNT 53, an accumulator 56, a first register 58 and a second register 60 connected to respective inputs of an arithmetic logic unit 62, the output of which is connected to the bus 54, an instruction register 64, a program counter 66, a random access memory address unit 69, RAM 70, a ROM address unit 72 and a ROM 74 whose output is connected to the bus 54. A data output buffer 76 is provided. This central processing unit is fabricated as a CMOS single chip and has an integral oscillator circuit whose frequency of operation is determined by an external ceramic resonator element X1, which is chosen to have a resonant frequency of about 2.5 MHz. The function of the CPU is to control the operation of the transponder, but the device is completely passive in the absence of the signal detected by the receiver 30. Instructions and data are held in the ROM and RAM of the CPU, which affects the behaviour of the transponder and affords the transponder the ability to uniquely identify itself to the interrogator and also to know when the interrogator is transmitting a message specific to it. The precise method of operation of the CPU unit will be described in detail with reference to the precise operations which are carried out as described below.

The CPU receives signals from the demodulator on input pins CD and DI, to input buffer 52. Count register 53 receives clock signals on input pin IN. CD may be regarded as a carrier detect signal which is high in the presence of a carrier signal. DI is the demodulated data elicited from the phase encoded received signals and IN is an input for the carrier wave frequency clock. The carrier wave cycles are counted by the CPU by means of the count register 53. This is an up-counter which generates an overflow signal to the CPU which is synchronised to a predetermined subdivision of the input carrier frequency, so that the CPU can cause events to occur that are in synchronism with the input carrier frequency rather than the local internal clock of the CPU whose frequency is determined by the ceramic resonator element X1. CPU controls a divider 80 and a modulator 82. The divider 80 is a circuit that divides a clock signal present at the output C of the demodulator 34 by 2. The divider derives the retransmission carrier signal which is half the interrogator signal. The divider action is enabled or disenabled by the logic signal on input pin R which is connected to output pin En of the CPU.

The advantage of having the transmission signal of the transponder related to the interrogator signal is that a phase coherent signal is provided, coherent with the interrogator signal. This means that phase varisation, jitter etc. which is present in the interrogator signal is also present in the transponder signal and this ensures synchronization of operation in the interrogator circuits which receives signals transmitted by the transponders. This is important since where a number of transponders are present, since if the frequency of their transmission signals were slightly different, the interrogator would have difficulty in synchronizing with the various transponder signals. However, by ensuring that all the transponders transmit the signals strictly in phase with the interrogator signal, this problem is avoided. This problem is naturally greater when long lengths of data are to be transmitted by the transponders.

As mentioned above the carrier wave cycles are counted in Register COUNT. Every time the register counts up to 16 it is reset thereby providing an output frequency which is supplied to output buffer 76. Data from RAM 70 which is to be transmitted is supplied to buffer 76 at a rate determined by register COUNT in accordance with a subroutine stored in ROM 74. Thus a data rate of 8250 bits per second is present at output buffer D0. The advantage of having an output buffer rate in synchronism with the input signal is that as described above the output signal is in synchronism with the input signal. The output signal D0 is provided to modulator 82.

The modulator 82 comprises an exclusive OR logic gate having two inputs, one input being connected to the divider 80 and the other input to the data output buffer of the CPU. The function of this circuit is to produce 180° phase modulated output signal switched between 0° and 180° by the logic signal present on output signal D0 of the CPU, the phase angle being measured with respect to the unmodulated input signal. The modulator circuit is obviously simple on account of the simple modulator method employed. The transmitter 84 comprises a ferrite core inductor 12 and capacitors C4 and C5 and is designed to produce a resonant circuit with a centre frequency of 66 Khz equal to half the centre frequency of the receiver. The circuit provides the transponder with a means for transmission of signals which are to be detected by the interrogator. The circuit is designed to develop a voltage across inductor 12 that is about four times the magnitude of the supply voltage available from the battery 86.

The battery 86 is a lithium cell having a nominal open circuit voltage of 2.95 volts. This provides quiescent power required by the transponder in the absence of an input signal for the data in RAM 76 for the amplifier 32 and the demodulator 34. The CPU is normally in a power down condition, but when it detects the presence of the carrier detect signal CD provided by demodulator 34 it is operative to switch on its internal circuits. This is affected by means of a complex logic structure internal to the CPU which continuously monitors the CD input whilst the CPU is in the power down condition, when the major sections of the circuitry of the CPU, especially the clock circuit associated with the external ceramic resonator elemont X1, are all completely static. An active signal detected on the CPU input causes the CPU to restart its operations from the quiescent state.

It will be understood that in view of the phase modulations of the carrier signal received at the transponder there are no gaps in transmission as would occur with an amplitude modulated signal for example. Hence the carrier detect signal CD is continuously present and there is no risk of this transponder accidentally going to a power down condition.

The amplifier 32, demodulator 34, divider 80 and modulator 82 may be embodied in one or possibly two standard CMOS integrated circuits. It is also possible for the CPU to be integrated on the same circuit so as to provide a single silicon chip.

MODES OF OPERATION

Reference will now be made to FIGS. 6 to 11 which shows modes of operation of the interrogator and transponder.

Figure 6:
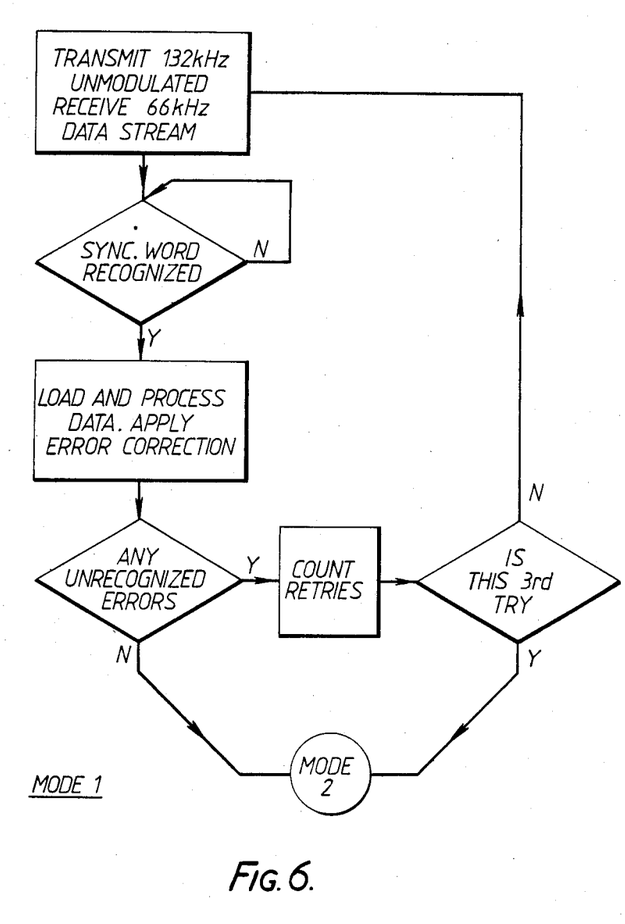
FIGS. 6 to 11 are flow charts of operation of the interrogator and transponder in various modes of operation.

Referring now to FIG. 6, a first mode of operation will be described. In this mode, the transmitter TX1 of the interrogator operates in standby mode transmitting an unmodulated carrier signal at a frequency of 132 Khz. When one or more transponders are present in the volume which extends from the interrogator over a useful range of about one meter, each transponder detects the unmodulated signal. As shown in FIG. 3 this unmodulated signal is detected in the demodulator 34 to provide a carrier detect signal to the input buffer 52 of the CPU. Logic in the CPU is designed to constantly monitor the signal on the CD input pin and when it detects the presence of the input carrier signal at this pin it begins to count cycles of the carrier signal present at the IN pin on register COUNT. The CPU enables the phase locked loop demodulator by means of a signal E from output DE in output buffer 76. The CPU on detecting the input carrier signal which is unmodulated and thus no input data is present at input D1 undergoes a subroutine of operation where it transmits from RAM 70 data concerning its identity. This data is stored on PAGE 0 of RAM 70. This data is sent one bit at a time in synchronism with the data output clock provided by register COUNT for modulation at modulator 82.

In this mode of operation, the interrogator detects the message which is received from the transponder modulated on the signal of 66 Khz. This signal is received in receiver RX1 and demodulated by a suitable demodulator present in receiver RX1 (which may comprise a phase locked loop). The structure of the data received by the interrogator is shown in FIG. 1 as comprising header bytes of SYNC and CONTROL information and the interrogator looks for the synchronizing word in the message and then processes the information bit by bit. It examines error correction information contained at the end of the message and attempts to reconstruct the error free message. If an error free message is successfully assembled in accordance with conventional computing techniques, the system immediately switches to the second mode of operation as shown in FIG. 7. If after having received a plurality of cycles of information from the transponder, for example three cycles of information, an error free message is not successfully assembled, the system results to the second mode of operation by default.

Figure 7A:
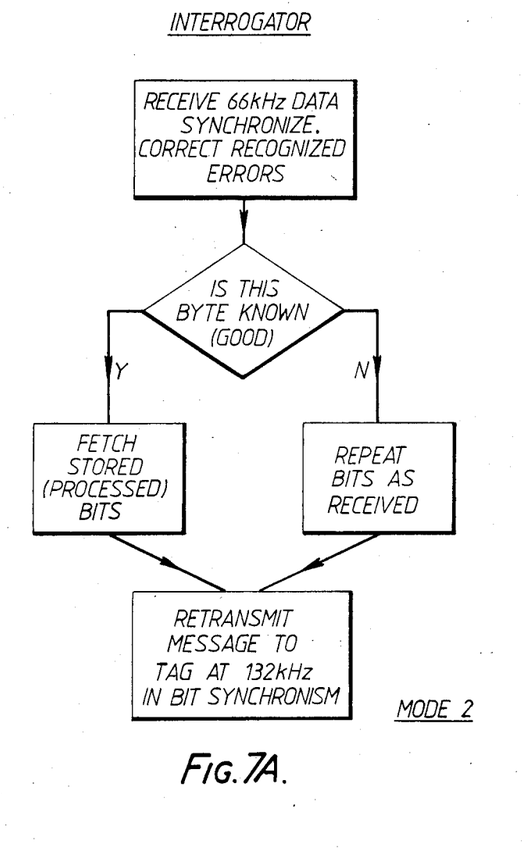
Figure 7B:
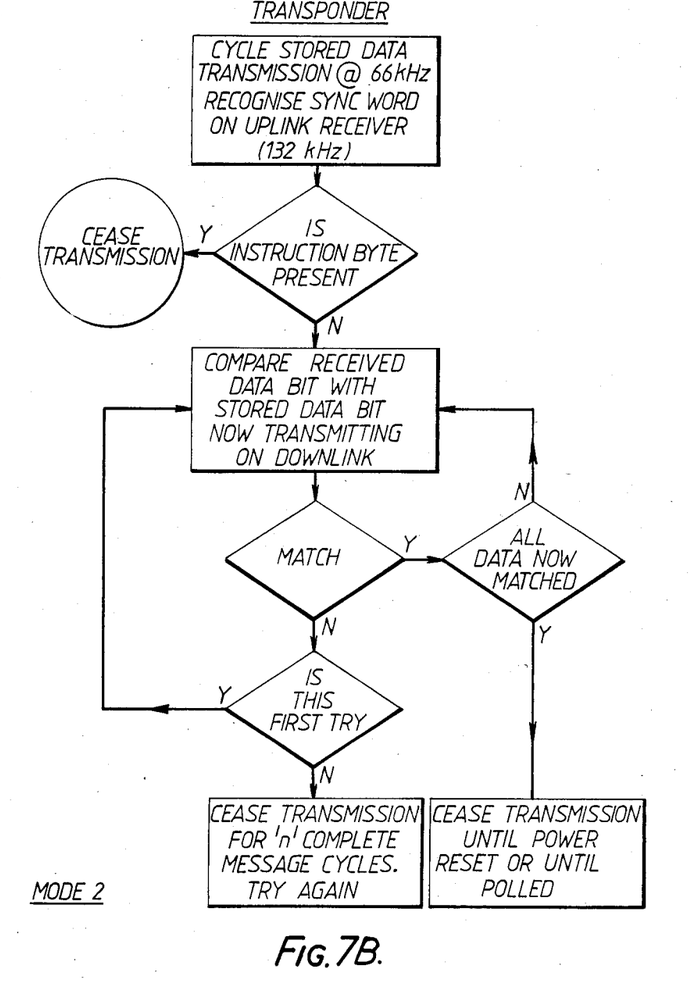

FIGS. 7A and B are flow charts representing mode 2 operation. In this mode the transmitter TX1 of the interrogator is modulated to repeat back to the transponder the error corrected message it has received and to repeat this message bit by bit in synchronism with the transponder operation. No instruction word is transmitted and the transponder is arranged so that in the event of receiving a correct synchronised repeat of the data stored in the transponder it will switch off the transmitter circuit in the transponder at the end of the error corrected message received from the interrogator.

Thus in this mode of operation the transmitter receives information in the data input buffer 20 and the CPU 18 immediately is arranged to transmit this information to an output buffer 14 where it is used to modulate the carrier signal in transmitter TX1. This carrier signal is transmitted to the transponder. The transmitter as determined by its internal program stored in ROM at the time when it transmits its identification signal is programmed to receive from the interrogator a repeat message of the transmitted identification signal. The transmitted signal and the received signal are compared by means of the registers 56, 58, 60 and the ALU 62 and when identity occurs a signal is generated to switch off the CPU and the remainder circuit of the transponder. This confirms to the interrogator that the received identification signal is correct, since the interrogator will receive no further identification signals of that particular time, hence the transponder is identified and therefore going to a power down condition.

If the system has reverted to this mode by default it is because the computer 18 has been unable to assemble an error-free message from the data passed to it by the receiver RX1 of the interrogator. This may be because it is in a high noise environment but it is more likely to be caused by the presence in the interrogation field of more than one transponder. In this condition the computer 18 causes the transmitter TX1 to repeat back to the transponder bit by bit information detected at the receiver RX1.

If the transponder is one of a plurality of transponders all simultaneously subjected to the interrogating signal, then at some point in the data stream, the information received by the transponder from the interrogator is not the same as that transmitted to the interrogator by the transponder i.e. the transponder may be transmitting a zero while it is received a one or vice versa. Under these conditions, the CPU within the transponder is arranged to:

1. Continue data transmission for the remainder of the message;
2. repeat the message for a second cycle;
3. if, during this second cycle there is a disagreement between received and transmitted information at any one bit position the transponder is designed to cease transmission immediately; wait for "n" message transmission cycles (where n is a number between 1 and 8 chosen at random) and then resume transmission. If contention between messages produced by a plurality of transponders is again detected by the transponder during the resumed transmission, the transponder transmission is stopped and a random delay inserted as before. This process continues indefinitely until an uncontended situation arises. The precise manner in which this is achieved by CPU 50 and control unit 10 is in accordance with conventional computing techniques.

Study of the flow chart shown in FIG. B will show that as transponders come clear of contention and succeed in transmitting a complete message, they are automatically switched off, thus reducing the number of competing tags to a smaller and smaller number and increasing the speed with which the remaining contention is cleared up.

Figure 8:
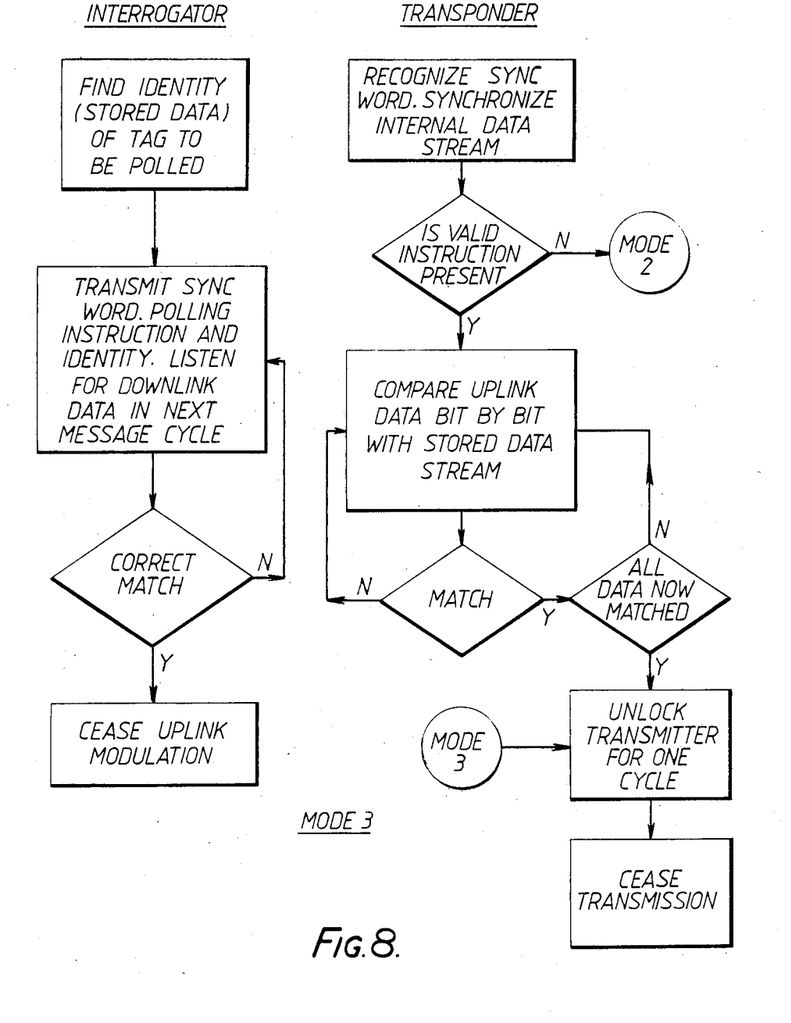

Turning now to FIG. 8, this shows flow charts for the interrogator and a transponder and is a mode which requires a specific instruction from the transmitter of the interrogator to the transponder.

In this mode, without waiting for synchronisation with the signal from the transponder, the transmitter of the interrogator broadcasts a synchronising word which is recognised by a subroutine of the CPU and used to set up instruction register 64 in the transponder to receive a further word which is a behavioural command. The receipt of any command word which is not a sequence of zeroes has the effect of switching off the transmitter within the transponder immediately by inhibiting operation of the divider 80 by application of the appropriate logic signal to the R pin on the divider via the output pin EN of the CPU, and placing the transponder in the 'listen mode'. Since this transmission is received by all transponders in the interrogation field, at that time every transponder is silenced. Once this has been achieved, the interrogator transmitter then transmits to all the transponders in the interrogation field, a data signal indicative of a known transponder on the assumption that that transponder is in the interrogation field. In other words, if known transponders are present each one can be polled.

In the same way that CPU 50 was used to recognise an exact correspondence between data transmitted and data received, the same subroutines now used to match the data received from the interrogator transmitter with data held in the memory PAGE 0 of the transponder ready for transmission (but in this case not actually transmitted). The detection of exact correspondence is used to unlock the transmitter in the transponder so that during the next cycle the data is transmitted from the transponder to the interrogator on the "down-link", confirming to the interrogator computer that the polled transponder is actually present. The polled transponder then reverts to the "listen" mode.

Figure 9:
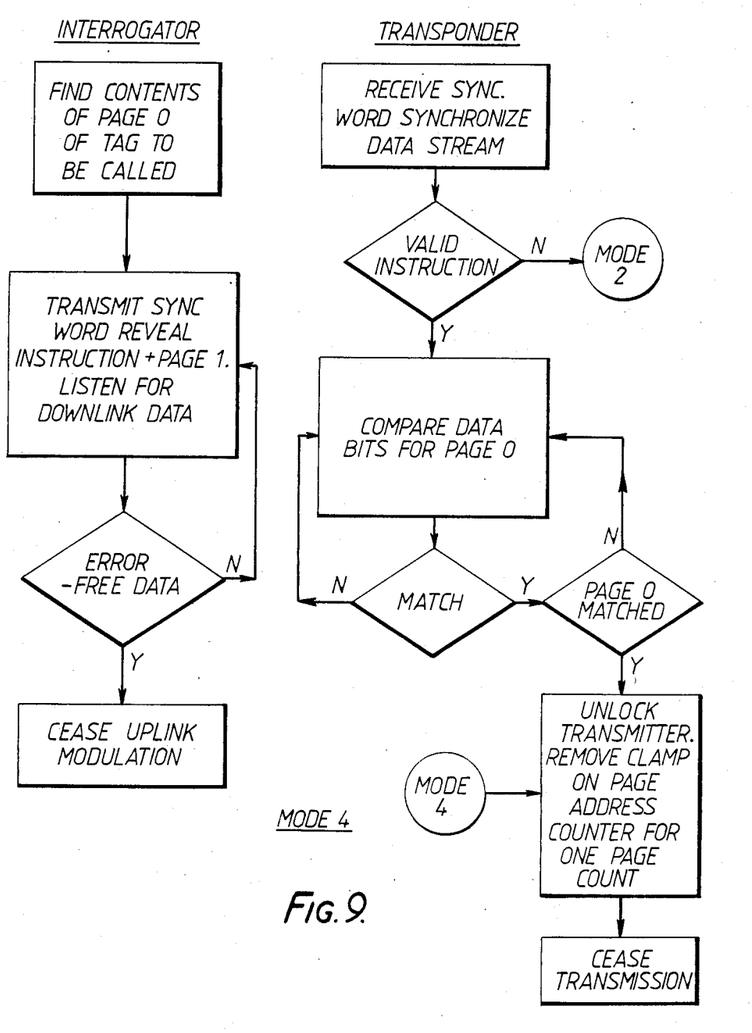

Up to this point, we have only considered the operation of transponders with one data area of (say) 64 bits of information, i.e. the data contained in PAGE 0. It may be a requirement of some users that more information be stored in the transponder than is required for every interrogation. The flow chart shown in FIG. 9 represents the operation of the interrogator and transponder when additional information is held in a transponder.

The additional information is held in the transponder in three further pages PAGE 1,2,3 in RAM 76 which are called into transmission mode by a specific instruction received from the interrogator transmitter. The specific instruction causes a specific transponder which has been identified by the recognition circuits used for the "polling" mode to respond by transmitting a data stream, comprising as many of the pages as are required. The interrogator transmitter responds by repeating the information received synchronously bit by bit as in the mode represented by FIGS. 7A and B. At the end of this sequence the transponder automatically reverts to "listen" mode when the comparison is successful.

If the interrogator is unable to detect an error-free stream of information, it will call the transponder by repeating the specific instruction and the contents of the PAGE 0 until a satisfactory sequence is achieved.

Figure 10:
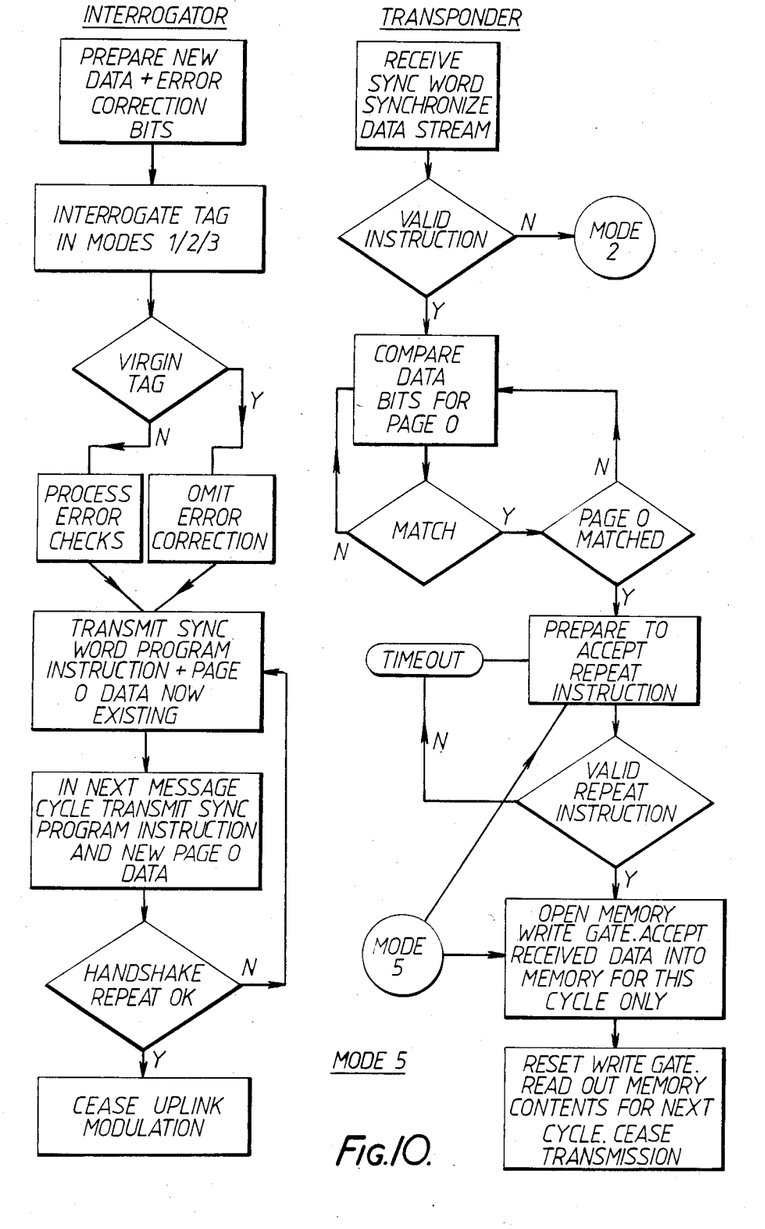

FIG. 10 shows the flow chart of a programming mode in which a transponder is specifically identified by a repeat of the existing contents of PAGE 0 (even if this should be a series of zeroes or random ones and zeroes which would be the case before the transponder has been programmed for the first time). The transponder reverts to the "listen" mode by the same logic used for the mode shown in FIG. 7B. In addition it is enabled for a "write" operation of the transponder memory at the beginning of the next data stream cycle from the interrogator. During this cycle the interrogation transmitter sends a particular instruction code and a fresh data stream bit by bit for storage in the transponder memory. During this cycle the interrogator transmitter sends the particular instruction code and the new data for the transponder memory bit by bit. During the following word cycle, the particular instruction code is removed, which causes the transponder to repeat back to the interrogator the new contents of its memory confirming the programming has taken place. At the end of this sequence the transponder reverts to the "listen" mode.

Figure 11:
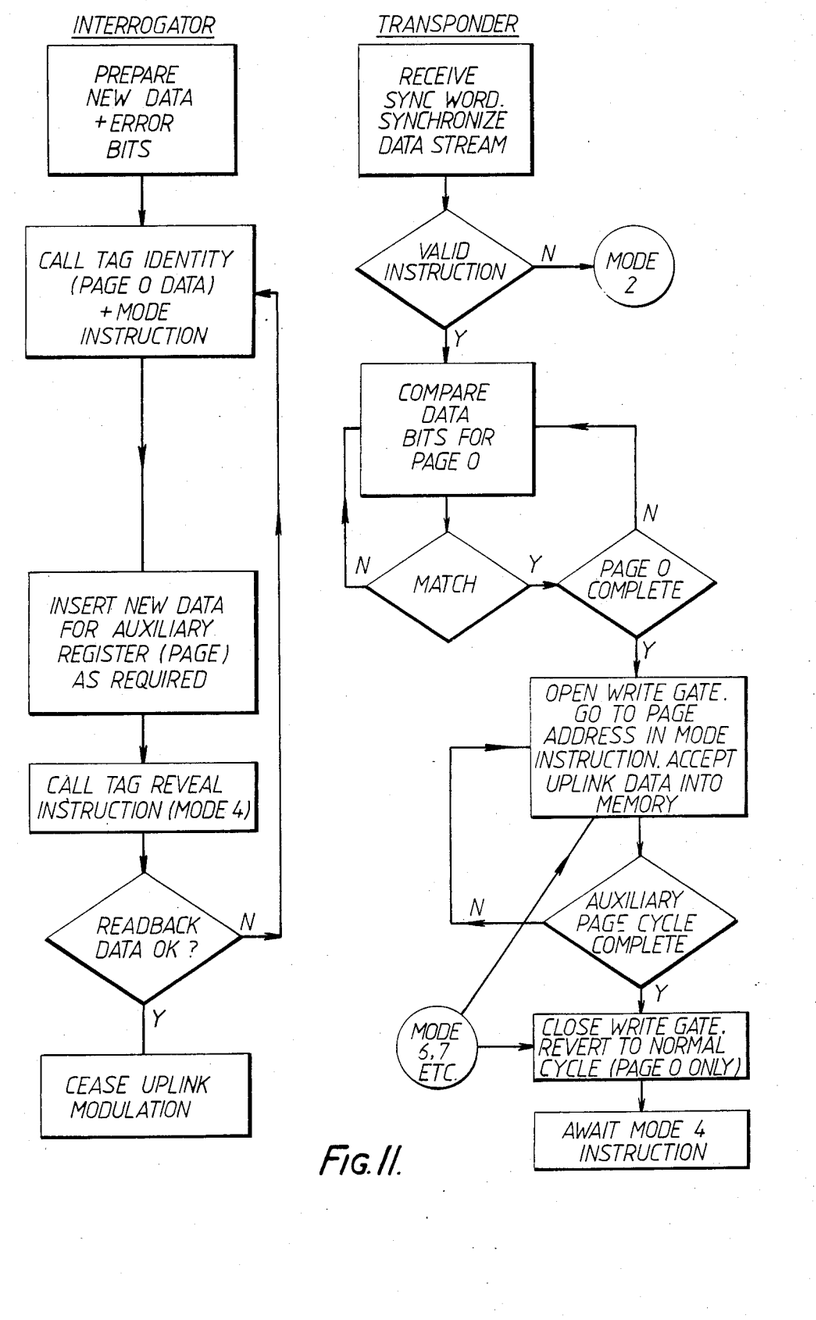

It will be recalled in relation to FIG. 9 that the transponder may contain more information than is stored for every interrogation, this information being held in one or more supporting pages which are called into transmission mode by a specific instruction from the interrogator transmitter. FIG. 11 shows the flow chart of how the supporting pages can have new data written into them.

After identifying the transponder by repeating the known contents of PAGE 0, preceded by a specific instruction byte indicating that new data is to be input into the or each auxiliary page, the interrogator transmitter sends the data stream which is required to be loaded in the first of the additional pages. At the end of the sequence, the interrogator transmitter sends the appropriate instruction byte to the transponder so that the system will operate in the manner described in relation to FIG. 9 and thus the transponder will repeat all the data in all its memory pages included that in PAGE 0 which has just been re-programmed.

If there should be more than one auxiliary page this is called up by a new instruction byte which causes the transponder to operate in the manner described above except that it applies to a different page.

A registor is provided on RAM PAGE COUNTER which contains the number of the pages currently being allocated by the CPU. This is used in accordance with the instructions held in the instruction register 64 to determine which page of RAM 70 is being processed.

We claim:

1. An identification system comprising an interrogator and a plurality of transponders;

the interrogator having transmission means for transmitting an interrogation signal;

each transponder having receiver means for receiving the interrogation signal and having means operative in response to reception of the interrogation signal to transmit a reply signal comprising a first coded identification signal;

the interrogator having means for receiving said reply signal, checking and retransmitting said reply signal; and wherein the system comprising the interrogator and transponders includes means for resolving contention between reply signals from different transponders which are received by the interrogator overlapping in time, such contention resolving means including the means within the interrogator for retransmitting said reply signal, and including comparison means within each transponder for comparing a retransmitted reply signal received by the transponder with its respective coded identification signal.

2. A system as claimed in claim 1, wherein the transponder comparison means compares the retransmitted identification signal with the first coded identification signal while the transponder is transmitting the first signal.

3. A system as claimed in claim 1, wherein in the event of correspondence between the retransmitted signal and the first signal, the transponder ceases transmission, and in the event of non-correspondence, the transponder continues transmission.

4. A system as claimed in claim 3, wherein in the event of non-correspondence between the retransmitted signal and the first signal, the transponder waits a predetermined variable time period before repeating the transmission of the first signal.

5. A system as claimed in claim 1 wherein the interrogator includes processor means for sending a second coded identification signal to the interrogator transmission means which transmits such second signal, the transmission occurring independently of any transponder transmission, the second coded identification signal being unique to a selected transponder, and each transponder including processor means for inspecting the second signal, and, in the event of correspondence between the second signal and the first coded identification signal stored by the transponder, the transponder transmits an acknowledgement signal.

6. A system as claimed in claim 5 wherein the interrogator, in response to receiving the acknowledgement, transmits a third coded identification signal and the processor means of the selected transponder writes over the first signal stored in the transponder with the third signal and to transmit the third signal in acknowledgement.

7. A system as claimed in claim 5 wherein the selected transponder includes a memory means having a plurality of pages, with the first coded identification signal being stored in a first page, further pages containing further information, and the interrogator transmits in response to the transponder acknowledgement, in one or a sequece of operations, data on a page by page basis to replace the data stored in the pages of the memory means, the transponder in response to the replacement of a data page, transmitting the contents of that data page in acknowledgement.

8. A system as claimed in claim 1, wherein the interrogator transmission means includes phase modulation means for modulating data onto a carrier signal, and each transponder includes means for detecting the interrogator signal comprising a phase locked loop for demodulating the interrogator signal to provide a data signal representing the data modulated on the carrier signal and a clock signal derived from the interrogator signal and the interrogator including means for integrating the interrogator signal to provide a continuous carrier detect signal and the transponder being responsive to the carrier detect signal to switch to a power on condition wherein the transponder is fully operative from a power down condition where only selected parts of the transponder are operative.

9. A system as claimed in claim 1 wherein each transponder includes a signal receiver and demodulation means, a signal generator coupled to transmitter means, a central processing unit and memory means for supervising operation of the transponder, battery means providing power to the transponder, and the central processing unit in response to detection of an interrogation signal, switching the transponder from a power down condition wherein the demodulator and generator are inoperative to a power on condition wherein the transponder is fully operative.

10. An identification system including an interrogator and a plurality of transponders, each transponder having stored therein a first coded identification signal unique to that transponder, wherein in response to interrogation by the interrogator each transponder transmits the first coded identification signal, and the interrogator includes means for receiving and checking the first identification signal and means for transmitting in reply the first or a second identification signal to the transponder, the transponder including processor means for inspecting the reply signal received from the interrogator means and taking a predetermined course of action in response to the result of the identification.

* * * * *